Patented Mar. 5, 1935

1,993,259

UNITED STATES PATENT OFFICE 1,993,259

SEPARATION OF FORMIC ACID FROM OTHER FATTY ACIDS

Hyym E. Buc, Roselle, N. J., assignor to Standard Oil Development Company

No Drawing. Application November 2, 1929, Serial No. 404,512

12 Claims. (Cl. 260—122)

This invention relates to a process of separating formic acid from its mixture with other fatty acids such as acetic acid, propionic acid, etc., whereby more valuable products are obtained for various purposes such as esterification of alcohols, etc.

The invention will be fully understood from the following description and the examples given by way of illustration.

It is known to those skilled in the art that fatty acids may be prepared by the oxidation of saturated hydrocarbons. There are such oxidation processes known which give a mixture of fatty acids in which formic acid forms a substantial part of the mixture. Such an acid mixture would be unsuitable for purposes of esterification of alcohols such as ethyl, isopropyl, etc., the esters of which are used as solvents for cellulose nitrates and other organic compounds. The presence of substantial amounts of formic acid is undesirable in the acid used for esterification because it hydrolyzes readily and gives an acidity which is known to be undesirable in those solvents. Small amounts of formic acid may be present in the acid mixture without considerable disadvantage since formic esters are removed during the purification of the ester mixture.

I have discovered that formic acid may be substantially completely separated from its mixture with other fatty acids by partial, selective neutralization as shown by the following examples:

Example 1.—A solution was prepared containing 41 parts by weight of an 85% solution of formic acid and 227 parts of glacial acetic acid. An analysis for formic acid showed this mixture to contain 13% of formic acid. To 50 parts of this solution, there was slowly added, without heating 5.8 parts of calcium oxide. This was an amount of alkali more than sufficient to neutralize the formic acid, but less than sufficient to neutralize both the formic and acetic acids. The mixture was centrifuged and the liquid separated from the precipitated salt. A determination of formic acid in the liquid showed that about 91.5% of it had been removed, whereas only about 9% of acetic acid had been neutralized.

Example 2.—8 kilograms of the untreated acetic acid in formic acid solution described in Example 1 were dissolved in 400 liters of petroleum naphtha that boils at 100° to 275° known as normal benzine. One kilogram of calcium oxide was added without heating and after a period of shaking, the benzine was poured off, the solid washed twice with benzine and then dried with a blast of air. A determination of formic acid on the solid residue showed that 90.3 per cent. of the formic acid had been removed, whereas only about 13% of the acetic acid had been neutralized.

Example 3.—Experiment (2) was repeated using 1.9 kilograms of anhydrous sodium carbonate instead of calcium oxide. 91.4% of the formic acid was removed and only 13% of the acetic acid.

These examples indicate that it is possible to remove most of the formic acid by one treatment with a suitable alkaline material, preferably an alkali metal or alkaline earth metal base. I may however, use with less advantage aluminum hydrates, zinc oxide or in general any basic material which will react preferentially with formic acid to form a precipitable salt. The treating may be carried out at atmospheric temperature or below that, but considerably higher temperatures may also be employed.

Having thus described my invention and illustrated with examples,

I claim:

1. The method of removing formic acid from its mixture with other fatty acids which comprises, partially neutralizing the acid mixture with a base, and separating the neutralized products from said mixture, whereby the proportion of formic acid in the mixture is decreased.

2. The method according to claim 1, in which the partial neutralization is effected by addition of an alkaline earth metal base.

3. The method according to claim 1, in which the partial neutralization is effected by addition of an anhydrous alkaline earth base.

4. The method according to claim 1, in which the amount of base added to the acid mixture is at least equivalent to the amount of formic acid present.

5. The method of removing formic acid from its mixture with other fatty acids which comprises partially neutralizing the acid mixture with a base to form salts, in the presence of a solvent which will leave a substantial part of the salts undissolved, and separating the salts from said mixture, whereby the proportion of formic acid in that mixture is decreased due to the preferential neutralization of formic acid.

6. The method according to claim 5, in which the partial neutralization is effected by addition of an alkali metal base.

7. The method according to claim 5 in which the partial neutralization is effected by addition of an anhydrous alkali-metal base.

8. The method according to claim 1, in which the partial neutralization is effected by addition of an anhydrous base.

9. The method according to claim 1, in which the base used is a base of a metal of the group consisting of the alkali and alkaline earth metals.

10. The method of removing formic acid from its mixture with other fatty acids, which comprises partially neutralizing the acid mixture with a base in the presence of a hydrocarbon solvent for the acids to form insoluble formates, and separating the resulting salts from said mixture, thereby decreasing the proportion of formic acid in the mixture.

11. The method according to claim 10, carried out in the presence of only a small amount of water.

12. In the manufacture of fatty acids by oxidation of hydrocarbons, the method of removing formic acid from its mixture with other fatty acids which comprises partially neutralizing the acid mixture with a base in the presence of residual hydrocarbons and separating the precipitated products from said mixture, whereby the proportion of formic acid in the mixture is decreased.

13. The method of removing formic acid from its mixture with acetic acid and other fatty acids produced by the oxidation of hydrocarbons, which comprises partially neutralizing the acid mixture with calcium oxide, and separating the precipitated products from said mixture, whereby the proportion of formic acid in that mixture is decreased.

HYYM E. BUC.